United States Patent [19]

Zaimi

[11] Patent Number: 5,238,700
[45] Date of Patent: Aug. 24, 1993

[54] FRUIT TEA PROCESS AND PRODUCT

[76] Inventor: Majid Zaimi, 7777 Fay Ave., Suite #131, La Jolla, Calif. 92037

[21] Appl. No.: 996,623

[22] Filed: Dec. 24, 1992

[51] Int. Cl.$^5$ .............................................. A23F 3/34
[52] U.S. Cl. .................................. 426/597; 426/435; 426/465; 426/466; 426/473; 426/590; 426/615
[58] Field of Search ............... 426/435, 615, 616, 465, 426/466, 473, 590, 597, 599

[56] References Cited

U.S. PATENT DOCUMENTS 3,966,995  6/1976  Workman ............................ 426/615

FOREIGN PATENT DOCUMENTS 201736  7/1920  Canada ................................ 426/466

OTHER PUBLICATIONS

Kushi, A, 1985, Complete Guide to Macrobiotic Cooking, "Homemade Grain Coffee", Warner Publications N.Y., N.Y. p. 340.

*Primary Examiner*—Helen F. Pratt
*Attorney, Agent, or Firm*—Ralph S. Branscomb

[57] ABSTRACT

A tea is made from a hard-fleshed, light-colored fruit such as the quince by a process of first grating the flesh of the fruit, heating the gratings to dry the grated strips and brown them slightly, and then grilling the mass on a hot, oil-less surface until the fruit turns a darker brown. The shredded mass is then removed from the heat. When steeped in boiling water, it produces a naturally sweet caffeine-free imitation of real tea.

4 Claims, No Drawings

FRUIT TEA PROCESS AND PRODUCT

BACKGROUND OF THE INVENTION

Many tea lovers have difficulty drinking regular tea because of the caffeine, or an allergic reaction to one of the chemical constituents of tea. Many of these people dearly love tea, especially in those countries where tea drinking is a tradition and in which enormous quantities of tea are consumed annually. Certain of these people feel truly deprived not to be able to partake of the tea flavor and aroma to which they have become so familiar over the years before having to quit consuming tea.

Although there are herb teas, typically these do not taste good, and lack the flavor and aroma of real tea. Often they are used for medicinal purposes, and are not really produced for the pleasure of tea consumption. Decaffeinated tea does not taste good, and does not eliminate the problem of allergies to other chemical constituents of the tea besides caffeine.

There is a need for a tea that is free of caffeine and free of the typical constituents of normal tea leaves that cause allergic reactions, and that tastes like tea and has the steaming aroma of hot tea.

SUMMARY OF THE INVENTION

The instant invention is such a product, comprising tea made from the fruit quince, which has all of the natural flavor of tea, and in addition is naturally sweetened to just the right sweetness to please the pallet of a typical tea drinker without the addition of artificial sweeteners or sugar.

The tea is prepared from *cydoni vulgaris,* a hard-fleshed apple-shaped fruit which is actually of the rose family, otherwise known as the quince. Although the quince is somewhat special in having these characteristics, there are probably other fruits of similar qualities which could be used as well.

The process of producing the tea from the quince fruit involves grating, partial desiccation at oven heating temperatures, and subsequent scorching of the partially dessicated gratings on a hot griddle to produce the dried brownish shreds that are subsequently steeped in boiling water to produce tea beverage.

DETAILED DESCRIPTION OF THE PREFERRED EMBODIMENT

Without doubt the tea described herein could be produced in mass quantities for commercial production and marketing. However, for purposes of this description and for simplicity, a home kitchen version of the process is described. As with any food product which moves from the kitchen to the factory, extrapolations of these process steps on a much larger scale are suggested.

In the preferred embodiment of the process and the tea as undertaken by the inventor, a ripe quince is shredded down to its central pit, with the quince skin being grated along with the rest of the quince flesh. This produces a mass of relatively uniformly shredded quince flesh shreds. That mass is then spread out relatively uniform on a flat surface such as a cookie sheet in an oven which is maintained at about the same temperature as boiling water, preferably between 210 and 220 degrees F. The shredded mass is left on the cookie sheet or other flat surface in the hot oven until it turns a yellowish or light golden color from the original apple-flesh-like color in which it originates.

At this point, the shredded mass is removed from the oven on the cookie pan. A hot frying pan is prepared, and the shredded mass is spread onto the hot pan. No oil or water or other frying liquids are used on the pan. The shredded mass heats rapidly for a period of 10-15 seconds on the average, and then begins to crackle as water-filled cells burst into steam.

Once the shreds begin to crackle, they are vigorously stirred for a period of about 5 seconds. During this stirring time, the color of the fruit shreds turns from the above-stated golden yellowish color, to a more golden brown. When the shreds are golden brown, they are removed from the frying pan or other hot, scorching surface, and they are ready for use in making tea. They can be stored for an indefinite time, or used immediately to make tea.

In order to make the tea, a normal sized teapot is filled with boiling water just as though normal tea from tea leaves were being made. One- to one-and-a-half teaspoons of the shredded material per cup, depending on the strength desired, is steeped in the boiling water for 5 minutes or so, and served hot.

The beverage product from the tea has the same color as tea, and the steamy aroma smells very much like normal tea. The flavor of the tea is not only like a very good quality leaf tea, but is also just sweet enough to satisfy the typical pallet without the addition of sugar or artificial sweeteners.

The product is ideal as a substitute for tea for those who cannot drink regular tea. Having the same flavor, aroma, and body of normal tea, involuntary abstainers from regular tea are not faced with the unpleasantness of having to partake in herbal teas amongst their friends who are consuming real tea at teatime.

It is hereby claimed:

1. A method of preparing tea from a fruit having a firm flesh and a light flesh color, comprising the following steps:
    (a) selecting a quince;
    (b) grasping said fruit specimen and grating the flesh of the quince to produce a mass of quince fruit shreds;
    (c) spreading said fruit shreds out substantially evenly on a flat surface in an oven and heating said shreds in said oven at a temperature of between 200 and 250 degrees F. until said mass of flesh turns from said light color to a yellowish/golden color;
    (d) removing said mass from said oven and placing same on a hot grill surface to scorch same for on the order of 10-15 seconds;
    (e) listening for said mass to make a crackling noise;
    (f) on hearing said crackling noise, stirring said mass rapidly for on the order of 5 seconds until it substantially turns brown; and
    (g) removing said mass from the griddle surface to be steeped in boiling water to produce a tea beverage.

2. A tea produced by the process of claim 1.

3. Fruit tea comprised of browned shredded quince which has been oven-dried, dry-grilled until brown, and stored ready to steep in boiling water.

4. Fruit tea according to claim 3 wherein said fruit tea is a fruit tea beverage comprised of said browned shredded quince steeped in a teapot of hot water wherein on the order of between one and one-and-a-half teaspoons of said browned shredded quince is used per cup of hot water.

* * * * *